United States Patent

Epling

[11] Patent Number: 5,534,213
[45] Date of Patent: Jul. 9, 1996

[54] INJECTION MOLDED LIMB FOR COMPOUND BOW

[76] Inventor: Marvin E. Epling, 1111 Corporate Dr., Farmington, N.Y. 14425

[21] Appl. No.: 405,915

[22] Filed: Mar. 16, 1995

Related U.S. Application Data

[63] Continuation of Ser. No. 133,886, Oct. 12, 1993.
[51] Int. Cl.[6] .............................. B29C 45/00; F41B 5/00
[52] U.S. Cl. ................ 264/328.1; 124/23.1; 264/328.18
[58] Field of Search ................................ 264/328.1, 258, 264/257, 328.17, 328.18; 124/23.1, 25.6, 86–89, 44.5; 273/DIG. 7

[56] References Cited

U.S. PATENT DOCUMENTS

| | | | |
|---|---|---|---|
| 2,316,880 | 4/1943 | Miller | 124/23.1 |
| 3,766,904 | 10/1973 | Izuta | 124/23.1 |
| 3,844,268 | 10/1974 | Ikeya | 124/87 |
| 4,129,634 | 12/1978 | Cecka et al. | 264/45.3 |
| 4,440,392 | 4/1984 | Popplewell | 264/328.9 |
| 4,812,247 | 3/1989 | Fahner et al. | 264/328.18 |
| 4,927,579 | 5/1990 | Moore | 264/328.18 |
| 5,041,258 | 8/1991 | Iiyama et al. | 264/328.18 |
| 5,141,689 | 8/1992 | Simonds | 124/23.1 |
| 5,201,775 | 4/1993 | Arbogast et al. | 264/275 |

FOREIGN PATENT DOCUMENTS

2304819  2/1973  Germany ..................... 124/23.1

*Primary Examiner*—Jill L. Heitbrink
*Attorney, Agent, or Firm*—Cumpston & Shaw

[57] ABSTRACT

A limb for a compound archery bow made by injection molding of a fiber-reinforced thermoplastic resin. The resin disclosed is nylon 6/6, and it is reinforced with 30 to 65 wgt. % long staple fiber glass, the nominal length of the individual fibers being about three eighths inch.

29 Claims, 1 Drawing Sheet

INJECTION MOLDED LIMB FOR COMPOUND BOW

This is a continuation of copending application Ser. No. 08/133,886 filed on Oct. 12, 1993.

BACKGROUND OF THE INVENTION

This invention relates to the discovery that a limb for a compound bow can be made by injection molding of a fiber reinforced thermoplastic resin. Heretofore limbs for compound bows have been made usually by compression molding, a relatively slow and highly labor intensive process, and it was widely believed that it would not be possible to achieve the necessary strength and other properties in a limb made by injection molding.

DESCRIPTION OF THE PRIOR ART

In compression molding of limbs for compound bows, strands of fiberglass roving are soaked in resin and carefully laid in a mold designed to provide equal density of the roving at all cross sectional positions along the length of the limb. The mold is closed on the glass/resin matrix, and holds it under heat and pressure until the resin has cured to a stable condition, The body so molded requires a great deal of work, much of it by hand, to become an acceptable bow limb, a lot of finish grinding, polishing, and buffing, besides drilling holes and cutting a notch to accept the compound mechanism, The process is described in greater detail in U.S. Pat. Nos. 4,735,667 and 4,649,889, issued to Richard Johnston, It has been thought that the reinforcing roving was needed in plastic bow limbs to provide the desired strength and resilience, that the parallel alignment of the strands of roving was essential, and the continuity of the individual glass fibers was important.

SUMMARY OF THE INVENTION

It has now been found, despite the generally accepted thinking in the industry, that, at least for compound bows of relatively light draw weight, a fully satisfactory limb can be made by injection molding of nylon 6/6 polyamide resin reinforced with about 30 wgt.% of long fiber glass staple, the individual fibers being about ⅜ths inch long. The holding time of the limb in the mold is very greatly reduced relative to the holding time needed in the compression molding process, and very little finishing work is required.

BRIEF DESCRIPTION OF THE DRAWINGS

A presently preferred embodiment will now be described in conjunction with the drawing, wherein.

DESCRIPTION OF THE PREFERRED EMBODIMENTS

Figure 1:
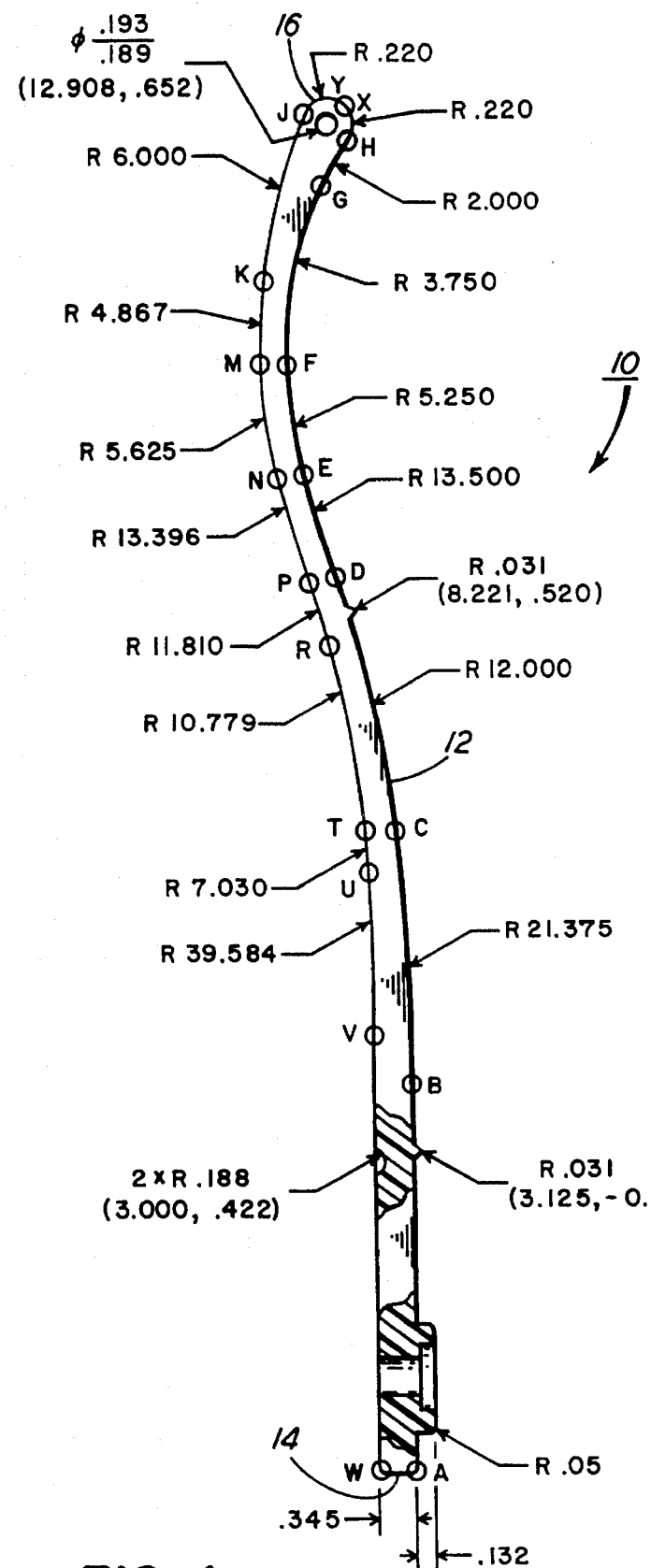
FIG. 1 is a side elevational view of a limb for a compound bow according to the invention.
Figure 2:
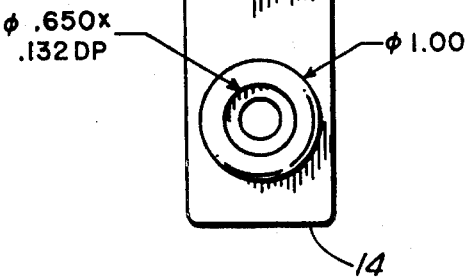
FIG. 2 is a front elevational view of the limb shown in FIG. 1.

The limb 10 as shown in the drawing includes a main body portion 12 of generally rectangular cross sectional shape and slightly tapered in thickness from its proximal end 14 toward its distal end 16. A central, longitudinal notch 18 is formed at the distal end 16 to accommodate the compound wheel or eccentric mechanism of the bow (not shown).

Typically, the limb may be about thirteen inches long, about 0.350 inch thick, and about one and one half inches wide. It is made of nylon 6/6 reinforced with about 30 to about 60 wgt. % long fiber glass fiber staple, the nominal staple length being three eighths inch.

The resin is delivered in the form of pellets about one eighth inch in diameter and three eighths inch long. They are placed in a hopper from which they are discharged in measured quantities through the throat of the machine into the barrel where they are heated to a temperature of about 560° to about 585° F., and delivered by a drive screw to one end of the barrel. When the mold becomes set to receive its charge, the heated nylon is forced into the mold under about 12,000 p.s.i. pressure, and the pressure is maintained at about that value until the mold gates freeze off, about five seconds, or so. In the present case a two-cavity, water cooled mold was used, maintained at a temperature of about 150° F., and the molded limbs become cooled to a stable state within about fifty five seconds, whereupon the mold is opened and the limbs ejected in the usual way.

The input gates of the mold were about ¹⁄₁₆th by about ³⁄₁₆ths inch in cross sectional dimensions, and they were located at the extreme distal ends of the limbs so that the flow of the resin from the barrel into the limb cavities was axially along the length of the limbs. It is thought that this arrangement tends to encourage the reinforcing fibers to lie generally parallel to one another and to the longitudinal axis of the limbs thus simulating as closely as possible the effect of the continuous filament roving used in the conventional compression molding process by which limbs for compound bows have heretofore been made, Limbs made according to the invention have been subjected to rigorous tests, including actual firing of target arrows in compound bows of up to twenty two pounds draw weight. Also, before being mounted on a bow handle the limbs are tested by being rigidly supported at their proximal ends and having dead weights of up to two hundred pounds hung from their distal ends for periods of twenty four hours, after which they are inspected to ascertain whether they have acquired excessive plastic deformation. In all cases observed to date the limbs do deform plastically up to a presently undetermined limit, but not enough to affect their function significantly, So far as presently available materials are concerned, nylon seems to have the best combination of strength and toughness for the purposes of the compound bow limb,

What is claimed is:

1. A method of making a plastic limb for a compound archery bow comprising the step of injecting a thermoplastic material reinforced with a plurality of long staple fibers having a nominal fiber length of about three-eighths inch or more axially into a limb mold cavity.

2. Method according to claim 1 wherein said thermoplastic material is nylon.

3. Method according to claim 1 wherein said thermoplastic material is nylon 6/6.

4. The method according to claim 1 wherein said long staple fiber is of glass.

5. The method according to claim 3 wherein said long staple fiber is of glass.

6. A method for injection molding a limb for a compound archery bow, comprising the steps of:

delivering a long fiber material-reinforced thermoplastic resin composite to a hopper of an injection molding machine, the long fiber reinforcing material having a nominal fiber length of about three-eighths inch or more;

discharging said long fiber material-reinforced thermoplastic resin composite in measured quantity from the hopper into a throat of the machine and then into a barrel of the machine;

heating said measured quantity of long fiber material-reinforced thermoplastic resin composite in said barrel to between about 560° F.–585° F.;

forcing said heated measured quantity of long fiber material-reinforced thermoplastic resin composite through a mold input gate located at an end of a limb mold cavity to axially fill said limb mold cavity;

cooling said molded limb; and ejecting said molded limb from said limb mold cavity.

7. The method of claim 6 wherein said step of forcing said heated measured quantity of long fiber material-reinforced thermoplastic resin composite through a mold input gate comprises doing so at a pressure of about 12,000 p.s.i.

8. The method of claim 6 wherein said step of forcing said heated measured quantity of long fiber material-reinforced thermoplastic resin composite through a mold input gate comprises maintaining the force for a time sufficient to freeze off said input gate.

9. The method of claim 6 in which the resin composite is nylon.

10. The method of claim 9 in which the resin composite is nylon 6/6.

11. The method of claim 10 in which the long fiber material is of glass.

12. The method of claim 6 in which the long fiber material is of glass.

13. The method of claim 6 in which the fibers are induced to lie parallel to one another and to the longitudinal axis of the limb.

14. A limb for a compound bow made according to the process set forth in claim 1.

15. A limb for a compound bow made according to the process set forth in claim 4.

16. A limb for a compound made according to the process set forth in claim 5.

17. A limb for a compound bow made according to the process set forth in claim 6.

18. A limb for a compound bow made according to the process set forth in claim 11.

19. A limb of a compound archery bow, comprising:

an elongate body having a proximal end and a distal end wherein said distal end has a longitudinally extending notch, further wherein said limb comprises an injection molded composite thermoplastic material including a long staple fiber reinforcing material having a nominal fiber length of about three-eighths inch or more and at least partially-longitudinally aligned with the bow limb.

20. The limb of claim 19 comprising between about 30–60 wgt.% of said long staple reinforcing material.

21. The limb of claim 19 in which said limb is a solid composition.

22. The limb of claim 19 in which said composite thermoplastic material comprises nylon.

23. The limb of claim 19 in which said long staple fiber reinforcing material comprises a glass fiber.

24. The limb of claim 19 in which said thermoplastic material comprises nylon 6/6.

25. The limb of clam 24 in which said composite material comprises an injection moldable pellet including a fully wetted fiber, wherein said pellet and said fiber each have a length, said lengths being substantially equal.

26. The limb of claim 25 including between about 30–60 wgt.% of said long staple reinforcing material.

27. The limb of claim 25 in which said lengths are approximately 0.375 inches.

28. The limb of claim 24 formed by filling a limb mold cavity in an axial manner with said composite material via a limb mold gate located at an end of said limb mold cavity.

29. The limb of claim 28 in which said limb mold gate has a cross section area of approximately 0.0625 inches by 0.1875 inches.

* * * * *